US010933533B2

(12) United States Patent
Isaac et al.

(10) Patent No.: US 10,933,533 B2
(45) Date of Patent: Mar. 2, 2021

(54) SYSTEMS, DEVICES, ARTICLES, AND METHODS FOR STOW VERIFICATION

(71) Applicant: Kindred Systems Inc., San Francisco, CA (US)

(72) Inventors: Neil Isaac, Toronto (CA); David Gabriel Hallock, Redwood City, CA (US)

(73) Assignee: Kindred Systems Inc., San Francisco, CA (US)

( * ) Notice: Subject to any disclaimer, the term of this patent is extended or adjusted under 35 U.S.C. 154(b) by 253 days.

(21) Appl. No.: 16/012,568

(22) Filed: Jun. 19, 2018

(65) Prior Publication Data

US 2018/0370038 A1 Dec. 27, 2018

Related U.S. Application Data

(60) Provisional application No. 62/524,348, filed on Jun. 23, 2017.

(51) Int. Cl.
*B25J 19/02* (2006.01)
*B25J 9/16* (2006.01)
*G06T 1/00* (2006.01)

(52) U.S. Cl.
CPC ............. *B25J 9/1697* (2013.01); *B25J 9/161* (2013.01); *B25J 9/163* (2013.01); *B25J 9/1679* (2013.01); *B25J 19/023* (2013.01); *G06T 1/0014* (2013.01); *G05B 2219/40078* (2013.01)

(58) Field of Classification Search
CPC . B25J 9/161; B25J 9/163; B25J 9/1679; B25J 9/1697; B25J 19/023; G05B 2219/40078; G06Q 10/08; G06Q 50/28; G06T 1/0014
See application file for complete search history.

(56) References Cited

U.S. PATENT DOCUMENTS

| | | | | |
|---|---|---|---|---|
| 7,559,134 B2* | 7/2009 | Gaida | ............... | H05K 13/0815 29/720 |
| 7,706,595 B2* | 4/2010 | Bushman | ........... | H05K 13/0812 382/141 |
| 7,813,559 B2* | 10/2010 | Duquette | ........... | H05K 13/0818 382/219 |
| 9,505,554 B1* | 11/2016 | Kong | ................. | H04N 5/23212 |
| 10,002,342 B1* | 6/2018 | Oikarinen | ............. | G05D 1/042 |
| 10,592,854 B2* | 3/2020 | Schwartz | ............. | G06K 9/4604 |
| 10,625,426 B2* | 4/2020 | Bogolea | ............... | G06Q 10/087 |
| 2006/0075631 A1* | 4/2006 | Case | ................... | H05K 13/0812 29/709 |
| 2011/0301744 A1* | 12/2011 | Ichimaru | ............... | B25J 9/1687 700/214 |
| 2012/0029686 A1* | 2/2012 | Ban | ....................... | B25J 9/1697 700/218 |
| 2012/0158180 A1* | 6/2012 | Iio | ........................ | B25J 9/1679 700/259 |
| 2013/0094932 A1* | 4/2013 | Kutsukake | ....... | G05B 19/41815 414/680 |

(Continued)

OTHER PUBLICATIONS

Bergeron et al., "Systems, Devices, Articles, and Methods for Prehension," U.S. Appl. No. 62/515,910, filed Jun. 6, 2017.

*Primary Examiner* — Robert T Nguyen
(74) *Attorney, Agent, or Firm* — Seed Intellectual Property Law Group LLP

(57) ABSTRACT

An end-effector may be summarized substantially as described and illustrated herein.

20 Claims, 10 Drawing Sheets

(56) References Cited

U.S. PATENT DOCUMENTS

| | | | |
|---|---|---|---|
| 2013/0166061 A1* | 6/2013 | Yamamoto | B25J 9/1697 |
| | | | 700/214 |
| 2014/0259644 A1* | 9/2014 | Matsuo | B25J 9/1687 |
| | | | 29/714 |
| 2017/0057092 A1* | 3/2017 | Ito | B25J 9/1697 |
| 2019/0099890 A1* | 4/2019 | Harada | G05B 19/401 |
| 2020/0117884 A1* | 4/2020 | Adato | G06K 9/00201 |

* cited by examiner

SYSTEMS, DEVICES, ARTICLES, AND METHODS FOR STOW VERIFICATION

TECHNICAL FIELD

The present disclosure relates to mechanical robotic grippers or end-effectors, robotic arms, and, more particularly, to end-effectors or robotic arms including cameras and related systems, articles, and methods.

DESCRIPTION OF THE RELATED ART

Robots

Robots are systems, machines, or devices that are capable of carrying out one or more tasks. A robot is an electro-mechanical machine controlled by circuitry, for example a processor following processor-executable instructions; a human operator controllable electro-mechanical machine; a robotic subsystem of another machine including another robot; or the like. A robot has the ability to move in a physical space and to accomplish physical tasks. Robots may be operated by a human operator, such as, via remote control, or may operate autonomously without control of an operator. Hybrid robots exist in which some functions are autonomous while others are operator controlled or control switches between autonomous and operator controlled modes. As well, a robot includes computational resources to preform computational tasks. The computational tasks can be in aid of the physical tasks.

End-Effectors

An end-effector or end of arm tool is a device attached to a robotic arm, manipulator, or appendage designed or structured to interact with an environment. Examples of end-effectors include grippers or graspers. End-effectors for robot operating in unstructured environments are devices of complex design. Ideally, these can perform many tasks, including for example grasp or grip or otherwise physically releasably engage or interact with an item or object.

BRIEF SUMMARY

A system including at least one end-effector moveable to be at least proximate with a plurality of reception spaces that includes a first reception space, at least one camera physically coupled to the at least one end-effector, and at least one processor communicatively coupled to the at least the at least one end-effector, and the at least one camera. The system also includes at least one nontransitory processor-readable storage device communicatively coupled to the at least one processor and which stores processor-executable instructions which, when executed by the at least one processor, cause the at least one processor to cause the at least one camera to capture a first image of the first reception space, wherein the first image includes reference information, and direct the at least one end-effector to grasp a first item from an input space reachable by the at least one end-effector. The processor-executable instructions which, when executed by the at least one processor, further cause the at least one processor to, after the at least one camera captures the first image, direct the at least one end-effector to release the first item to the first reception space, and after the at least one end-effector releases the first item, cause the at least one camera to capture a second image of the first reception space, where the second image includes comparison information. The processor-executable instructions which, when executed by the at least one processor, further cause the at least one processor to, compare the reference information and the comparison information, and if the reference information and the comparison information once compared show the first item was not correctly stowed in the first reception space, generate an error signal including error information that represents first item was not correctly stowed in the first reception space.

A method controlled by at least one processor in communication with at least one end-effector and at least one camera physically coupled to the at least one end-effector, the method includes causing the at least one camera to capture a plurality of reference images for a plurality reception spaces, where a respective reference image in the plurality of reference includes respective reference information. The method further includes partitioning sequentially, by the at least one processor and the at least one end-effector, a plurality of items, where the plurality of items admits to a partition into a plurality of parts. Partitioning includes grasping, by the at least one end-effector, a respective item from the plurality of items, and after causing the at least one camera to capture the plurality of reference images, releasing, by the at least one end-effector, the respective item to a respective reception space in the plurality of reception spaces, where the respective reception space is associated with a respective reference image in the plurality of reference images. After releasing the respective item to the respective reception space, the method further includes capturing, by the at least one camera, a comparison image of the respective reception space, where the comparison image includes comparison information. The method further includes comparing, by the at least one processor, respective reference information for a respective reference image in the plurality of reference images with comparison information included in the comparison image, and if the respective reference information and the comparison information once compared show the respective item was not correctly stowed in the respective reception space, generating, by the at least one processor, an error signal that includes error information that represents respective item was not correctly stowed in the respective reception space.

A manipulator, an end-effector, and a camera may be summarized substantially as described and illustrated herein.

A system may be summarized as including an end-effector, a camera, and a processor substantially as described and illustrated herein.

A nontransitory processor-readable storage device which stores processor-executable instructions which, when executed by at least one processor, cause the at least one processor to operator a robotic system substantially as described and illustrated herein.

A method of operation of an end-effector and a camera may be summarized substantially as described and illustrated herein.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

Systems, devices, articles, and methods are described in greater detail herein with reference to the following figures in which.

DETAILED DESCRIPTION

Figure 1:
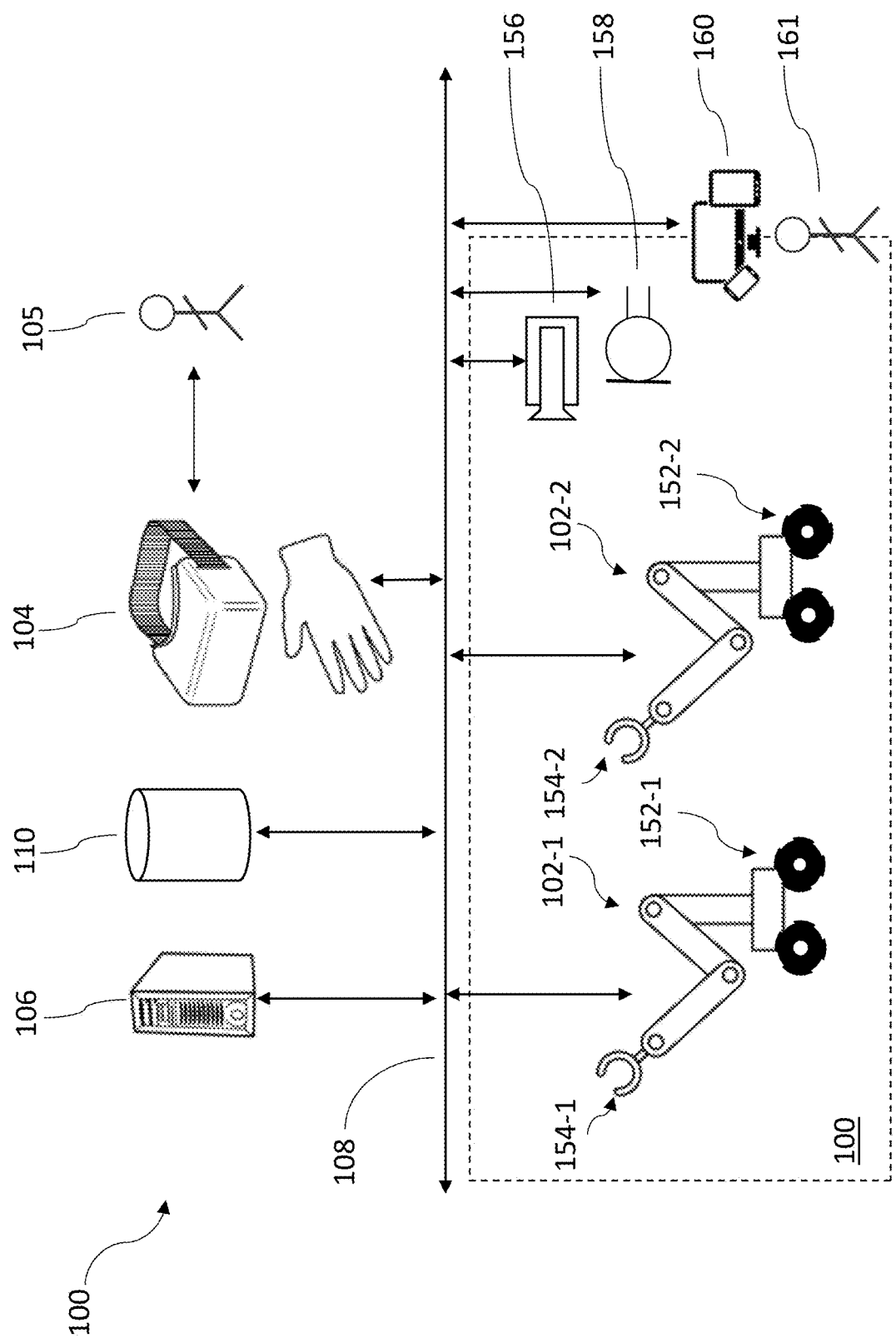
FIG. 1 is a schematic diagram illustrating a portion of a robotic system.

In the following description, some specific details are included to provide a thorough understanding of various disclosed embodiments. One skilled in the relevant art, however, will recognize that embodiments may be practiced without one or more of these specific details, or with other methods, components, materials, etc. In some instances, well-known structures associated with end-effectors and/or robotics, such as processors, sensors, storage devices, network interfaces, workpieces, tensile members, fasteners, electrical connectors, mixers, and the like are not shown or described in detail to avoid unnecessarily obscuring descriptions of the disclosed embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one", "an", or "another" applied to "embodiment", "example", or "implementation" means that a particular referent feature, structure, or characteristic described in connection with the embodiment, example, or implementation is included in at least one embodiment, example, or implementation. Thus, the appearances of the phrases "in one embodiment", "in an embodiment", or "another embodiment" or the like in various places throughout this specification are not necessarily all referring to the same embodiment. Furthermore, the particular features, structures, or characteristics may be combined in any suitable manner in one or more embodiments, examples, or implementations.

It should be noted that, as used in this specification and the appended claims, the user forms "a", "an", and "the" include plural referents unless the content clearly dictates otherwise. Thus, for example, reference to a robot including "an end-effector" includes an end-effector, or two or more end-effectors. It should also be noted that the term "or" is generally employed in its sense including "and/or" unless the content clearly dictates otherwise.

The headings provided herein are for convenience only and do not interpret the scope or meaning of the embodiments.

A robot executing one or more sets of processor-executable instructions to partition or sort a plurality items into a plurality of reception spaces may mistakenly place an incorrect number of items in a target reception space, for example placing two items in a target reception space when the instructions prescribed only one item was to be placed in the target space. Additionally or alternatively, the robot may unknowingly fail to place one or more items in the target reception space. A robot including a still or video camera (or other imager) disposed near the end of the robot arm or manipulator may use the camera to capture images of all reception spaces from an equivalent angle. Processor-executable instructions could, when executed, verify items in the plurality of item are correctly stowed or sorted. The processor-executable instructions, when executed, would cause the camera to capture images of each output space in the plurality of spaces at a reference time, e.g., at startup. The instructions would then after each stow action capture a further image (now the instant image), and compare the images to determine whether an item was successfully stowed. If so, then the reference image for the next stow action is replaced by the instant image. Systems, devices, articles, and methods in conformance with this description have benefits, such as, creating separate images per reception spaces that compensate for lighting and background variation between reception spaces, and creating images from a similar angle relative to each reception space.

FIG. 1 shows an exemplary system 100 in accordance with the present systems, devices, articles, and methods. Various components of system 100 are optional. As shown, system 100 includes robot 102-1 and robot 102-2 (collectively 102). Robots 102 may be associated with, e.g., communicatively coupled to, one or more optional operator interfaces, e.g., optional operator interface 104. Optional operator interface 104 may include one or more displays and input devices. System 100 includes a computer system 106, an example of a processor-based device. While illustrated as a pair of robots 102 and computer system 106, various implementations can include a greater number of robots (102) and/or computer systems (106). In some implementations, system 100 includes a nontransitory computer- and processor-readable storage device 110.

Robots 102 and computer system 106 are communicatively coupled via a network or non-network communication channel 108. Examples of a suitable network or non-network communication channel 108 include a wire based network or communication channel, optical based network or communication channel, wireless network or communication channel, or a combination of wired, optical, and/or wireless networks or communication channels.

A human operator 105 at operator interface 104 can selectively pilot one or both of robots 102. In human operator controlled (or piloted) mode, the human operator observes representations of sensor data, for example, video, audio, or haptic data received from one or more environmental sensors or internal sensors. The human operator then acts, conditioned by a perception of the representation of the data, and creates information or executable instructions to direct robots 102 or other robot(s). Robots 102 operate in, and receive data about, an environment 140 that comprises a physical space. The term "about" is employed here in the sense of represent, characterize, or summarize. The data about an environment 140 is received from one or more sensors. In some implementations, the one or more sensors are on or otherwise carried by robots 102. In some implementations, the one or more sensors are external to or separate from robots 102, such as, camera 156, microphone 158.

In piloted mode, robots 102 execute robot control instructions in real-time (e.g., without added delay) as received from the operator interface 104 without taking into account or revision by the controller based on sensed information.

In some implementations, robots 102, operate without an operator interface 104 or human operator, e.g., autonomously. Robots 102 may operate in an autonomous control mode by executing autonomous control instructions. For example, computer system 106 or robots 102 can use sensor data from one or more sensors associated with operator generated robot control instructions and the operator generated robot control instructions from one or more times robots 102 was in piloted mode to generate autonomous robot control instructions for subsequent use. For example, by using deep learning techniques to extract features from the sensor data such that in autonomous mode the robots 102 autonomously recognize features and/or conditions in its environment and in response perform a defined act, set of acts, a task, or a pipeline of tasks. Exemplary acts include recognizing the presence of a red ball, or any colour ball, depending on the features extracted from the sensor data, and kicking the ball. In the absence of a ball, the robot executing the autonomous robot control instructions would not kick the air as if a ball was present.

In some implementations, the computer system 106 is a smaller processor based device like a mobile phone, single board computer, embedded computer, and the like. The computer system 106 may, in some instances, be termed or referred to interchangeably as a computer, server, or an analyzer 106. Computer system 106 may create autonomous control instructions for robots 102 or another robot. In some implementations, robots 102 autonomously recognize features and/or conditions in the surrounding environment as represented by a representation (e.g., presentation, depiction) of the environment and one or more virtual items composited into the environment, and in response to being presented with the representation perform one or more actions or tasks.

In some instances, robots 102 may be controlled autonomously at one time, while being piloted, operated, or controlled by a human operator at another time. That is, operate under an autonomous control mode and change to operate under a piloted mode (i.e., non-autonomous). In a third mode of operation robots 102 can replay or execute piloted robot control instructions in a human operator controlled (or piloted) mode. That is operate without sensor data and replay pilot data.

A robot, like robots 102, is an electro-mechanical machine controlled by circuitry, for example circuitry that includes a processor that executes and follows processor-executable instructions; a human operator controllable electro-mechanical machine; a robotic subsystem (or apparatus) of another machine including a robot; or the like. A robot performs physical acts, actions, or tasks, for example, working with tangible results and/or computational tasks. A robot has the ability to move in a physical space, such as environment 140, to accomplish physical tasks. As well, a robot includes computational resources, on-board and/or remote computational resources, to perform computational tasks. The computational tasks can be in aid of the physical tasks, e.g., planning, as a task, for accomplishing a tangible result to physical task. A robot has the ability to acquire information from sensors, on-board and/or remote sensors. A robot can be part of or included in a larger system like system 100.

A robot typically includes a propulsion or motion subsystem comprising of one or more motors, solenoids or other actuators, and associated hardware (e.g., drivetrain, wheel(s), treads) to propel the robot in a physical space. An example of a motion subsystem is a set of drivetrain and wheels, such as, drivetrain and wheels 152-1, 152-2 (collectively 152) of robot 102-1, 102-2, respectively. The space does not need to be horizontal or terrestrial. Examples of spaces include water, air, underground, vertical spaces, outer space and the like.

A robot typically includes a manipulation subsystem comprising one or more appendages, such as, one or more arms and/or one or more associated end-effectors, arm and end-effector 154-1, 154-2 (collectively 154) of robot 102-1, 102-2. An end-effector is a device attached to a robotic arm designed to interact with the environment. End-effectors for robot operating in unstructured environments are devices of complex design. Ideally, these are capable of performing many tasks, including for example grasp, grip, physically releasably engage, or otherwise interact with an item.

System 100 includes a sensor subsystem comprising one or more sensors, such as, one or more imagers or cameras 156, and/or one or more microphones 158. (Robots 102 may include an onboard sensor subsystem. See examples, disclosed herein at, at least, FIG. 2.) A sensor subsystem which acquires data that characterizes or represents the robots 102 in a context or scenario, and/or performing one or more tasks. The data includes environmental sensor information, or environment information, representative of environmental conditions external to robots 102.

System 100 includes an observer interface system. System 100 includes one or more observer interfaces 160 coupled to network or non-network communication channel 108. The observer interfaces 160 include input or output parts. An example of an output part is a display of explanatory text or a dynamic representation of robots 102 in a context or scenario. For example, the dynamic representation robot includes video and audio feed, for instance a computer-generated animation. Useful video and audio formats include H264 and Opus respectively. Example of an input part includes a WIMP interface. An observer 161 may observe or monitor the operation of system 100, robots 102 or the like from observer interfaces 160.

Figure 2:
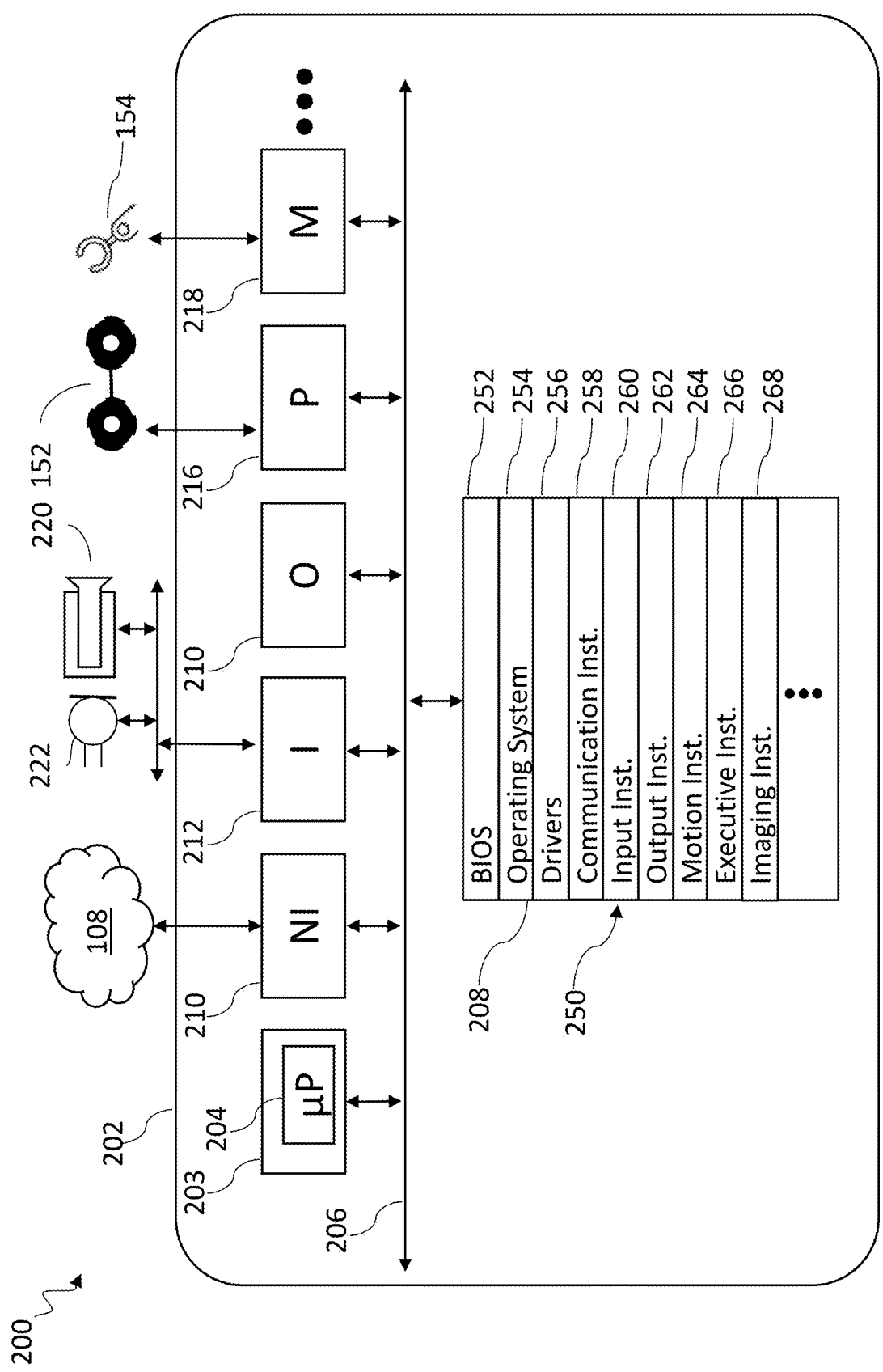
FIG. 2 is a schematic diagram illustrating an exemplary robot suitable for inclusion in the system of FIG. 1.

FIG. 2 schematically shows parts of a robot 200, including a processor, for use in the system 100, shown in FIG. 1, in accordance with the present systems, devices, articles, and methods. Robot 200 includes at least one body or housing 202, and a control subsystem 203 that includes at least one processor 204, at least one nontransitory computer- and processor-readable storage device 208, and at least one bus 206 to which, or by which, the at least one processor 204 and storage device(s) 208 are communicatively coupled. In some implementations, robot 200 comprises a sub-set of the illustrated robot 200, including control subsystem 203, bus(es) 206, storage device(s) 208, and network interface subsystem 210.

Robot 200 includes a network interface subsystem 210, e.g., a network interface device, that is communicatively coupled to bus(es) 206 and provides bi-directional communication with other systems (e.g., external systems external to the robot 200) via a network or non-network communication channel 108. The network interface subsystem 210 includes one or more buffers. Network interface subsystem 210 receives and sends data related partition of a plurality of items. Network interface subsystem 210 may be any circuitry effecting bidirectional communication of processor-readable data, and processor-executable instructions, for instance radios (e.g., radio or microwave frequency transmitters, receivers, transceivers), communications ports and/or associated controllers. Suitable communication protocols include FTP, HTTP, Web Services, SOAP with XML, WI-FI™ compliant, BLUETOOTH™ compliant, cellular (e.g., GSM, CDMA), and the like. Suitable transportation protocols include TCP/IP, SCTP, and DCCP.

Robot 200 includes an input subsystem 212 comprising one or more sensors that detect, sense, or measure conditions or states of robot 200 and/or conditions in the environment in which the robot operates, and produce or provide corresponding sensor data or information. Such sensors include cameras or other imagers, touch sensors, load cells, pressure sensors, microphones, meteorological sensors, chemical sensors or detectors, or the like.

Robot 200 includes an output subsystem 214 comprising output devices, such as, speakers, lights, and displays. Input subsystem 212 and output subsystem 214, are communicatively coupled to processor(s) 204 via bus(es) 206. In some implementations, input subsystem 212 includes receivers to receive position and/or orientation information. For example, a global position system (GPS) receiver to receive GPS data, two more time signals for the control subsystem 203 to create a position measurement based on data in the signals, such as, time of flight, signal strength, or other data to effect a position measurement. Also for example, one or more accelerometers can provide inertial or directional data in one, two, or three axes.

Robot 200 includes a propulsion or motion subsystem 216 comprising motors, actuators, drivetrain, wheels, and the like to propel or move the robot 200 within a physical space and interact with it. The propulsion or motion subsystem 216 propulsion or motion subsystem comprises of one or more motors, solenoids or other actuators, and associated hardware (e.g., drivetrain, wheel(s), treads), to propel the robot in a physical space. For example, the propulsion or motion subsystem 216 includes drive train and wheels 152.

Robot 200 includes a manipulation subsystem 218, for example comprising one or more arms, end-effectors, associated motors, solenoids, other actuators, linkages, drivebelts, and the like coupled and operable to cause the arm(s) and/or end-effector(s) to move within a range of motions. The manipulation subsystem 218 is communicatively coupled to the processor(s) 204 via bus(es) 206. For example, manipulation subsystem 218 includes arm and end-effector 154.

A person of ordinary skill in the art will appreciate the components in robot 200 may be varied, combined, split, omitted, or the like. In some implementations one or more of the network interface subsystem 210, input subsystem 212, output subsystem 214, propulsion or motion subsystem 216 and/or manipulation subsystem 218 are combined. In some implementations, one or more of the subsystems (e.g., input subsystem 212) are split into further subsystems. In some implementations, bus(es) 206 is a plurality of buses (e.g., data buses, instruction buses, power buses) included in at least one body. For example, as part of a modular computing architecture where computational resources at distributed over the components of robot 200. That is, a robot, like robot 200, could in some implementations, have a processor in a left arm and a storage device in its thorax. In some implementations, computational resources are located in the interstitial spaces between structural or mechanical components of the robot 200. A data storage device could be in a leg and a separate data storage device in another limb. In some implementations, the computational resources distributed over the body include redundant computational resources.

The at least one processor 204 may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. The at least one processor 204 may be referred to in the singular, but may be two or more processors.

The at least one storage device 208 is at least one nontransitory or tangible storage device. In some implementations, storage device(s) 208 includes two or more distinct devices. The storage device(s) 208 can, for example, include one or more a volatile storage devices, for instance random access memory (RAM), and one or more non-volatile storage devices, for instance read only memory (ROM), Flash memory, magnetic hard disk (HDD), optical disk, solid state disk (SSD), and the like. A person of skill in the art will appreciate storage may be implemented in a variety of ways such as a read only memory (ROM), random access memory (RAM), hard disk drive (HDD), network drive, flash memory, digital versatile disk (DVD), any other forms of computer- and processor-readable memory or storage medium, and/or a combination thereof. Storage can be read only or read-write as needed. Further, modern computer systems and techniques conflate volatile storage and non-volatile storage, for example, caching, using solid-state devices as hard drives, in-memory data processing, and the like.

The at least one storage device 208 includes or stores processor-executable instructions and/or processor-readable data 250 associated with the operation of robot 200, system 100, and the like. Herein processor-executable instructions or data includes processor-executable instructions and/or processor-readable data. Herein and associated drawings instructions includes processor-executable instructions and/or processor-readable data.

The execution of the processor-executable instructions or data cause the at least one processor 204, or control subsystem 203, to carry out various methods and actions, for example via the propulsion or input subsystem 212, and/or manipulation subsystem 218. The processor(s) 204 can cause a robot, such as robot 200, to carry out various methods and actions, e.g., identify and manipulate items. Processor-executable instructions or data 250 can, for example, include a basic input/output system (BIOS) 252, an operating system 254, drivers 256, communication instructions or data 258, input instructions or data 260, output instructions or data 262, motion instructions or data 264, executive instructions or data 266, and imaging instruction or data 268.

Exemplary operating systems for operating system 254 include ANDROID™, LINUX®, and WINDOWS®. The drivers 256 include processor-executable instructions or data that allow processor(s) 204 to control circuitry of robot 200. The processor-executable communication instructions or data 258 include processor-executable instructions or data to implement communications between the robot 200 and an operator console or terminal, a computer, or the like. The processor-executable input instructions or data 260 guide robot 200 in processing input from sensors in input subsystem 212. Processor-executable output instructions or data 262 guide the robot 200 in interacting within the environment via components of manipulation subsystem 218 or output subsystem 214. Processor-executable motion instructions or data 264 guide robot 200 in moving within its environment via components in propulsion or motion subsystem 216. For example, processor-executable motion instructions or data 264 may perform motion planning, inverse kinematics, or other motion related tasks. Processor-executable motion instructions or data 264 may implement, in part, various methods described herein, including those in and in relation to FIGS. 7-9A, 9B.

The processor-executable executive instructions or data 266 guide the robot 200 in reasoning, problem solving, planning tasks, performing tasks, and the like. The processor-executable executive instructions or data 266 may implement, in part, various methods described herein, including those in and in relation to FIGS. 7-9A, 9B. The processor-executable imaging instruction or data 268 may, when executed, implement, in part, various methods related to capture of images or analysis of images. The processor-executable imaging instruction or data 268 may implement, in part, various methods described herein, including those in and in relation to FIGS. 7-9A, 9B including at 702, 710, 712, 714, 902, and 904 described herein below.

Input subsystem 212 comprises sensors or transducers that acquire data for the robot. The data includes sensor information. Sensor information includes environmental sensor information representative of environmental conditions external to robot 200. Sensor information includes robotic conditions or state sensor information representative of conditions or states of the robot including the various subsystems and components thereof. Such sensors may include one or more of cameras or imagers (e.g., responsive in visible and/or nonvisible ranges of the electromagnetic spectrum including for instance infrared and ultraviolet), radars, sonars, touch sensors, pressure sensors, load cells, microphones, meteorological sensors, chemical sensors, or the like. Exemplary sensors include camera 220 and microphone 222. Sensor information can, for example, include diagnostic sensor information that is useful in diagnosing a condition or state of the robot 200 or environment in which robot 200 operates. For example, such sensors may include contact sensors, force sensors, strain gages, vibration sensors, position sensors, attitude sensors, accelerometers, and the like. In some implementations, the diagnostic sensors include sensors to monitor a condition and/or health of an on-board power source (e.g., battery array, ultra-capacitor array, fuel cell array).

The output subsystem 214 comprises one or more output devices. The output subsystem 214 allows robot 200 to send signals into the robot's environment. Example output devices are speakers, displays, lights, and the like. Robot 200 may communicate with an agent, such as, a person, and another robot.

Figure 3:
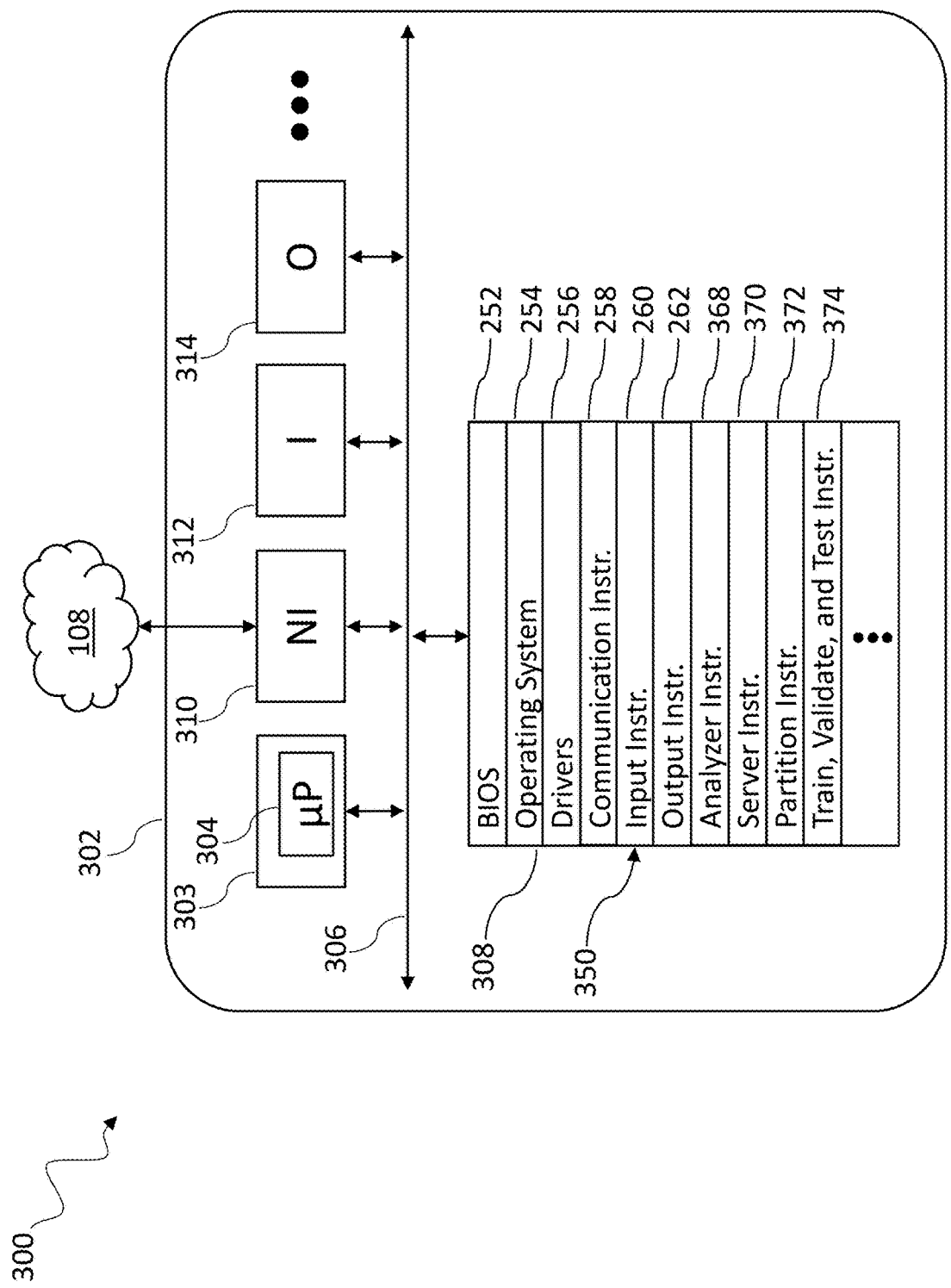
FIG. 3 is a schematic diagram illustrating an exemplary processor-based device suitable for inclusion in the system of FIG. 1.

FIG. 3 schematically shows exemplary parts of a system 300, including a processor, that may be used as computer system 106 in FIG. 1. System 300 shares some similar components with robot 200 but typically differs in lacking the propulsion or motion sub-system and the manipulation sub-system. System 300 has different components within some sub-systems, such as, an input subsystem 312 and output subsystem 314.

System 300 includes at least one body or housing 302, and a control subsystem 303 that includes at least one processor 304, at least one nontransitory computer- or processor-readable storage device 308, and at least one bus 306 to which the at least one processor 304 and the at least one nontransitory computer- or processor-readable storage device 308 are communicatively coupled. System 300 includes a network interface subsystem 310 that is communicatively coupled to bus(es) 306 and provides a bi-directional communicative coupler among system 300 and other systems (e.g., processor based devices associated with observers, online storage providers) via network or non-network communication channel 108.

System 300 includes an input subsystem 312. Input subsystem 312 may include one or more user interface input devices, such as, a touch display, a keyboard, a mouse or other pointer device, a microphone, and a camera. In some implementations, input subsystem 312 is coupled to control subsystem 303 via network interface subsystem 310. In some implementations, input subsystem 312 includes one or more sensors such as environmental sensors.

System 300 includes an output subsystem 314 comprising one or more output devices, such as, displays, speakers, and lights. Input subsystem 312 and output subsystem 314, are communicatively coupled to processor(s) 304 via bus(es) 206.

Storage device(s) 308 includes or stores processor-executable instructions or data 350 associated with the operation of system 300, or system 100. Processor-executable instructions or data (even reference numbers 252-262) described herein and, with appropriate changes, are applicable to system 300, e.g., absence of a motion subsystem. In various implementations, storage device(s) 308 includes or stores one or more of: processor-executable analyzer instructions or data 368, processor-executable server instructions or data 370, processor-executable partition instructions or data 372, and processor-executable train, validate, test instructions or data 374. The processor-executable analyzer instructions or data 368, processor-executable server instructions or data 370, processor-executable partition instructions or data 372, and processor-executable train, validate, test instructions or data 374 may implement, in part, various methods described herein, including those in and in relation to FIGS. 7-9A, 9B.

Processor-executable analyzer instructions or data 368, when executed by control subsystem 303, generates processor-executable robot control instructions, such as, autonomous robot control instructions. Processor-executable server instructions or data 370, when executed by processor(s) 304, guide system 300 to coordinate the operation of system 100, act as a mediator between robots 102, computer system 106, coordinate the operation of system 400, and the like. Processor-executable partition instructions or data 372, when executed by processor(s) 304, guide system 300 to partition items. The processor-executable partition instructions or data 372 may, in part, implement various systems, devices, articles, and methods described herein, including those in and in relation to FIGS. 7-9A, 9B; methods described herein including method 700, method 800, and method 900; and parts of methods including at 704 and 802.

The processor-executable train, validate, test instructions or data 374, when executed by processor(s) 304, guide system 300 to train, validate, and test an agent with augmented reality data. Processor-executable train, validate, test instructions or data 374 may, in part, implement various systems, devices, articles, and methods described herein.

Figure 4:
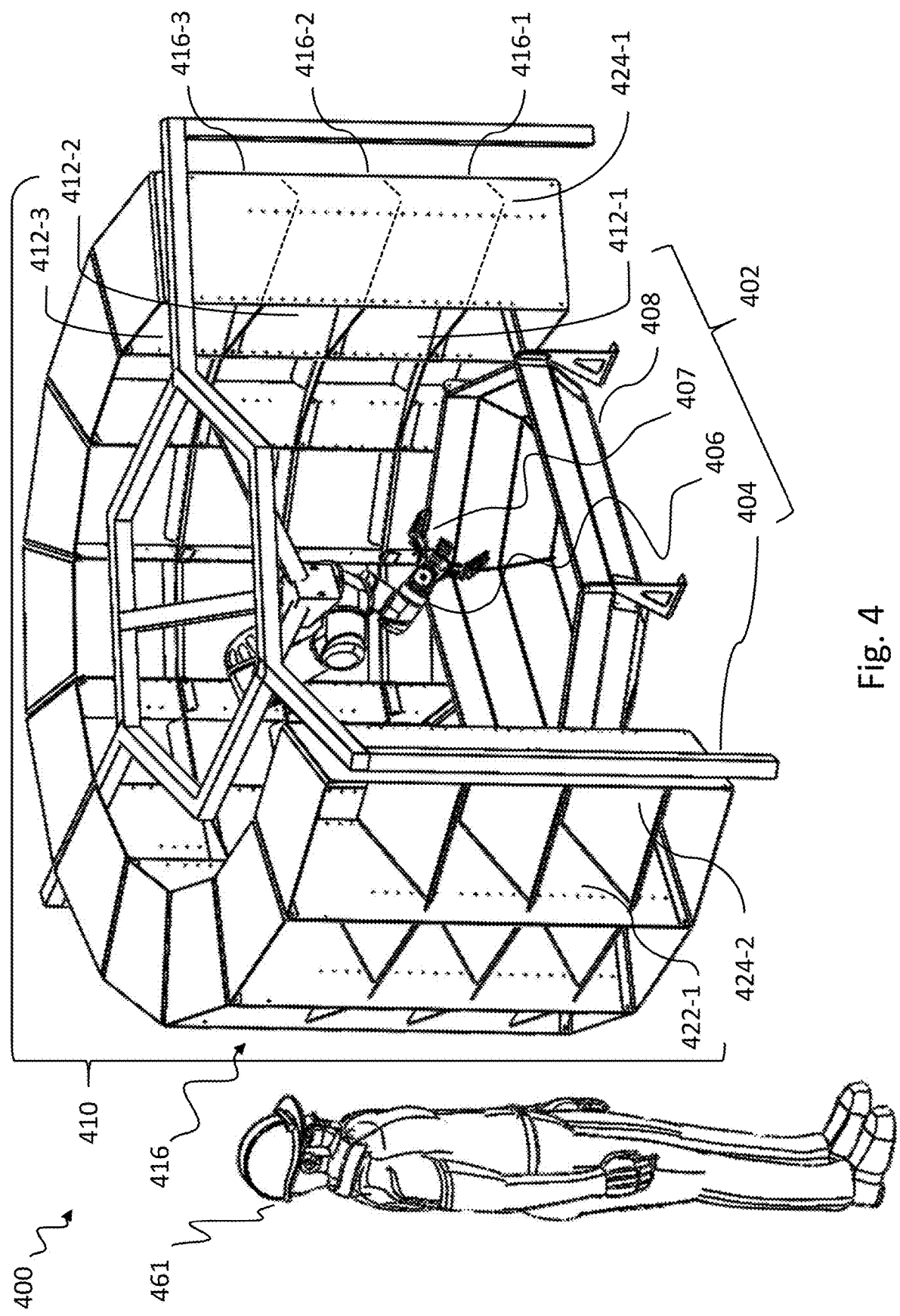
FIG. 4 illustrates, in a perspective view, an exemplary device that includes at least one manipulator and at least one end-effector.

FIG. 4 illustrates, in a perspective view, an exemplary device 400 in accordance with the present systems, articles, and methods, along with a worker 461. Device 400 includes at least one end-effector 407.

Device 400 includes an input part 402 and an output part 410. In some implementations, input part 402 includes a frame 404 which may be coupled or connected to a base, e.g., floor, ground, or platform. One or more multi-joint manipulators 406, e.g., robotic arm, may be coupled or connected to frame 404. Manipulator(s) 406 may couple to at least one end-effector 407 distally disposed on manipulator(s) 406 relative to frame 404. Herein device 400 and methods described herein are described as being performed by manipulator and end-effector. However, device 400 and methods described herein, such as method 700, method 800, and method 900, may include at least one manipulator or end-effector.

Manipulator(s) 406 may be a lightweight six joint industrial robot arm, such as, a UR5™ from Universal Robots A/S of Odense, DK. The UR5™ has a lifting ability of 5 Kg and have a working radius of 850 mm. Manipulator(s) 406 may be a multi-purpose industrial robot arm such as the LR Mate 200iD-7L™ from FANUC Corporation of Oshino, Yamanashi prefecture, JP with place of business in Rochester Hills, state of Michigan, U.S. The LR Mate 200iD-7L™ includes six joints and a reach of 911 mm. Manipulator(s) 406 may be sized to allow manipulator(s) 406 to move largely unimpeded by frame 404. The manipulator(s) 406 may be fitted with an end-effector such as an EZGRIPPER™ from Sake Robotics of Redwood City, state of California, U.S. (not shown) or the end-effectors described in commonly assigned US provisional application, application Ser. No. 62/515,910, filed Jun. 6, 2017 (some examples shown herein at, at least, FIG. 6).

The manipulator(s) 406 and associated end-effector(s) 407 may move items to, from, and within input space 408. Input space 408 may be disposed proximate to end-effector(s) 407 such that end-effector(s) 407 may grasp workpieces or items in input space 408. The end-effector(s) 407 and associated manipulator(s) 406 may move workpieces or items to, from, and around output space 410. The output space may include a plurality of cubbies 412 that may be accessed from the opposite side 416.

A plurality of items may be disposed in input space 408. The plurality of items may be referred to as a batch or group, may be of two or more types, or may be associated with two or more specified or defined, partitions (i.e., parts) of the plurality of items. The plurality of items item may be added to input space 408 in tranches, e.g., one container at a time with intervening action by at least one processor or end-effector(s) 407. Device 400 may be used in a way such that as successive items are added to items already present in input space 408 the addition of items is regarded as correct when the added items partially or fully complete the batch. That is, when one or more items are present in input space 408 a correct procedure could be to only allow addition of further items to input space 408 when the further items complete the batch. For example, two containers may be placed or dumped into an input space 408. One worker 461 could provide the two containers or two different workers to provide the two containers including items. There could be some or no time separation between the adding items from the two containers.

Device 400 includes a plurality of reception spaces 412-1, 412-2, 412-3 (only three called out for clarity of drawing, collectively 412) proximate to input space 408 and manipulator(s) 406. For example, the end-effector(s) 407 and associated manipulator(s) 406 may be moveable to be at least proximate with the plurality of reception spaces 412. The end-effector(s) 407 and associated manipulator(s) 406 may move items from input space 408 to the plurality of reception spaces 412, or to, from, and around in input space 408. The end-effector(s) and associated manipulator(s) 406 may grasp a first respective item from a plurality of items in input space 408. The end-effector(s) 407 and associated manipulator(s) 406 may transfer the first respective item to a first reception space in the plurality of reception spaces 412, e.g., space 412-1. The end-effector(s) 407 and associated manipulator(s) 406 may grasp a second respective item from the plurality of items, and may transfer the second respective item to the first reception space (e.g., space 412-1) or a second reception space (e.g., space 412-2, or 412-3).

Device 400 may include a plurality of extraction spaces 416-1, 416-2, 416-3 (only three called out for clarity of drawing, collectively 416). The plurality of extraction spaces 416 may correspond to (e.g., one to one) the plurality of reception spaces 412. For example, reception space 412-1 may correspond to extraction space 416-1, for instance the reception space 412-1 corresponding extraction space 416-1 may be coupled via a passage therebetween or otherwise provide access for items placed in the reception space 412-1 to transit to the corresponding extraction space 416-1. That is an item transferred from input space 408 to reception space 412-1 may be retrieved from extraction space 416-1. The plurality of extraction spaces 416 may overlap to (e.g., one to one) the plurality of reception spaces 412. A pair of one reception space and one extraction space may include an overlapping volume or area. The one reception space may be accessed via a first opening and the one extraction space may be accessed via a second opening.

Device 400 may include a plurality of septums 422-1 (only one called out for clarity of drawing). A respective septum, e.g., septum 422-1, may be disposed between and separate a respective pair of reception spaces 412, or a respective pair of extraction spaces 416. That is, a septum 422-1 may define a boundary between a pair of spaces, e.g., separate a respective pair of reception spaces 412, a respective pair of extraction spaces 416, or a reception space and an extraction space.

Device 400 may include a plurality of slides 424-1, 424-2 (only two called out for clarity of drawing, collectively 424). A respective slide, e.g., slide 424-1, may be disposed between and couple a reception space and an extraction space, e.g., reception space 412-1 and extraction space 416-1. That, is a slide included in the plurality of slides 424 may allow for one or more items to be transferred (e.g., slide) from a reception space and a corresponding extraction space. The slide may be arranged such that end-effector(s) 407 may release an item in a reception space and a worker, such as worker 461, may extract or retrieve the item from a corresponding extraction space.

Figure 5:
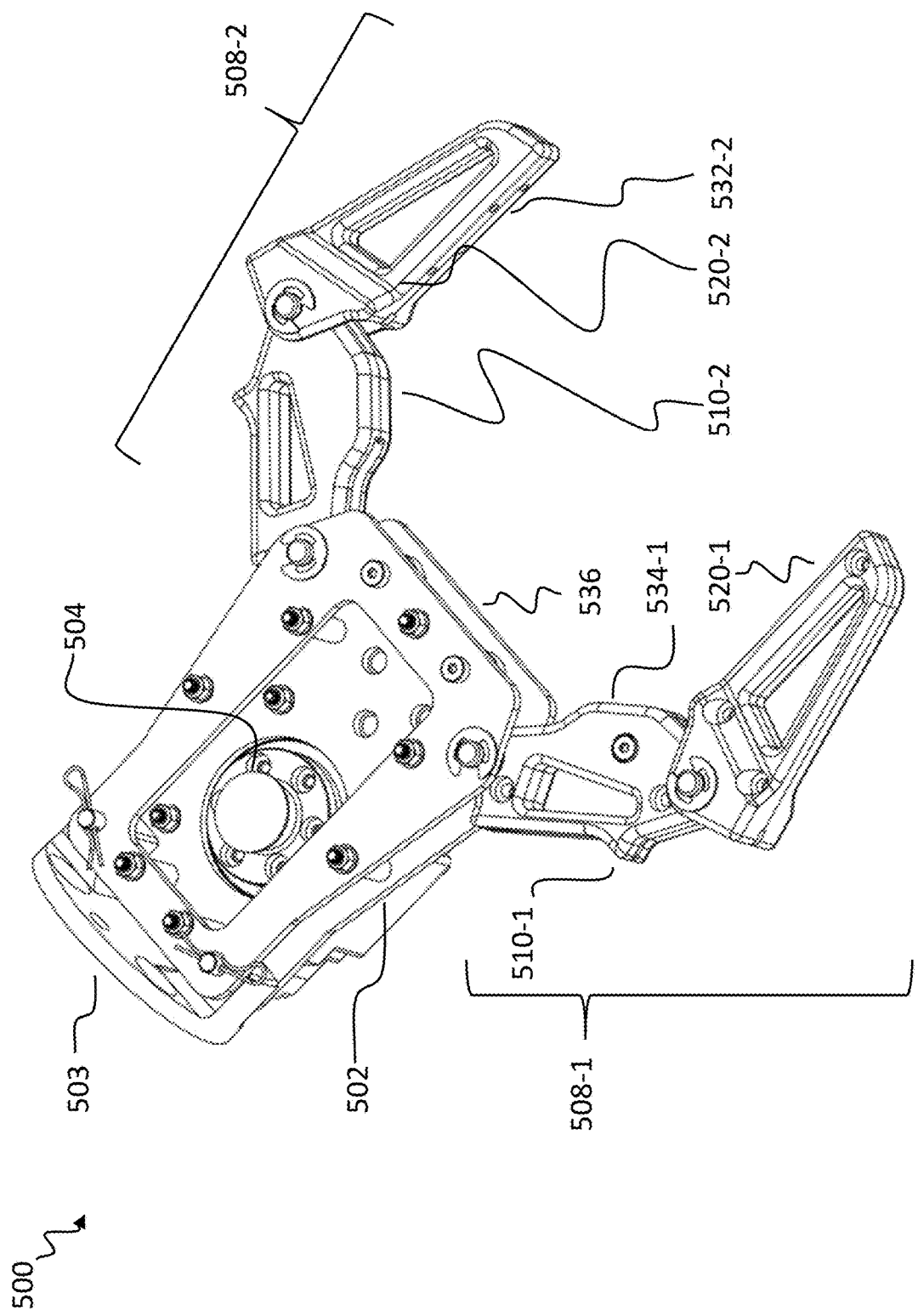
FIG. 5 illustrates, in a perspective view, an exemplary device that may be included in an end-effector.

FIG. 5 illustrates an exemplary device 500 that may serve as or part of an end-effector, such as, end-effector 407 show in FIG. 4. Device 500 includes base 502, a body to which other components may be coupled, e.g., connected. Base 502 may be made of metal, plastic, or composite in one or more parts. Base 502 is a link including two or more nodes. Device 500 may be coupled to another component such as manipulator(s) 406 or robot 102-1. For example, device 500 may include an attachment point 503, which may be part of base 502, or a separate body coupled to base 502, e.g., rigidly coupled.

In at least one implementation, device 500 includes an actuator 504 coupled to base 502. The actuator 504 could be a rotatory actuator, such as a servo or motor coupled to a windlass directly or via a gear train, shaft, belt, chain or the like. Actuator 504 could be a linear actuator. One or more tensile members may be coupled to and pulled by actuator 504. Actuator 504 may draw in or pull, or release or let out a tensile member.

In at least one implementation, device 500 includes a plurality of fingers 508. In some implementations, the fingers 508 are underactuated. In some implementations, the plurality of fingers 508 includes two fingers. In some implementations, a first finger in the plurality of fingers 508 opposes a second finger in the plurality of fingers 508.

A respective finger in the plurality of fingers 508 includes a proximal link 510-1, 510-2 (collectively 510) that may be described as phalange or segment. Proximal link 510, such as proximal link 510-1 and 510-2, is a body and specifically a compressive member. Proximal link 510 includes at least two nodes for that can act as couplers to other links, such as, base 502.

A respective finger in the plurality of fingers 508 includes a distal link 520-1 and 520-2 (collectively 520) that may be described as phalange or segment. Distal link 520, such as distal link 520-1 and 520-2, includes at least two nodes that can act as couplers to other links, such as, proximal link 510 or other components, such as, actuator 504 via a tensile member. In some implementations, one or more links in the plurality of fingers 508 includes pads disposed on the volar side of the link, such as, links 510 and 520. The volar area of device 500 is defined below. For example, distal link 520-2 may be associated with a distal volar pad, e.g., 532-2, included or coupled to the volar side of a distal link 520-2. In some implementations, proximal link 510-1 is associated with a proximal volar pad 534-1 included, or coupled to, the volar side of proximal link 510-1. The pads disposed on the volar side of links such as a distal volar pad, e.g., 532-2 may include ingressive devices or surface treatment such as pins, spines, scales, or ridges that physically penetrate a surface of the item. The pads disposed on the volar side of links include contigutive devices or surface treatment such as coating, liquids, smoothed surface, or ridges that creates an adhesion by glue, surface tension or the like. The pads disposed on the volar side of links such as a distal volar pad, e.g., 532-2 may include a plurality of tactile elements or tactels.

Device 500 may include a rest 536 that serve as a palm in device 500 but defines what looks like the edge of a purlicue in the human hand, i.e., space between finger and thumb. The rest 536 may be defined by part of base 502 or at least one body coupled to base 502. Rest 536 defines the volar area and thus the volar direction for device 500.

Figure 6:
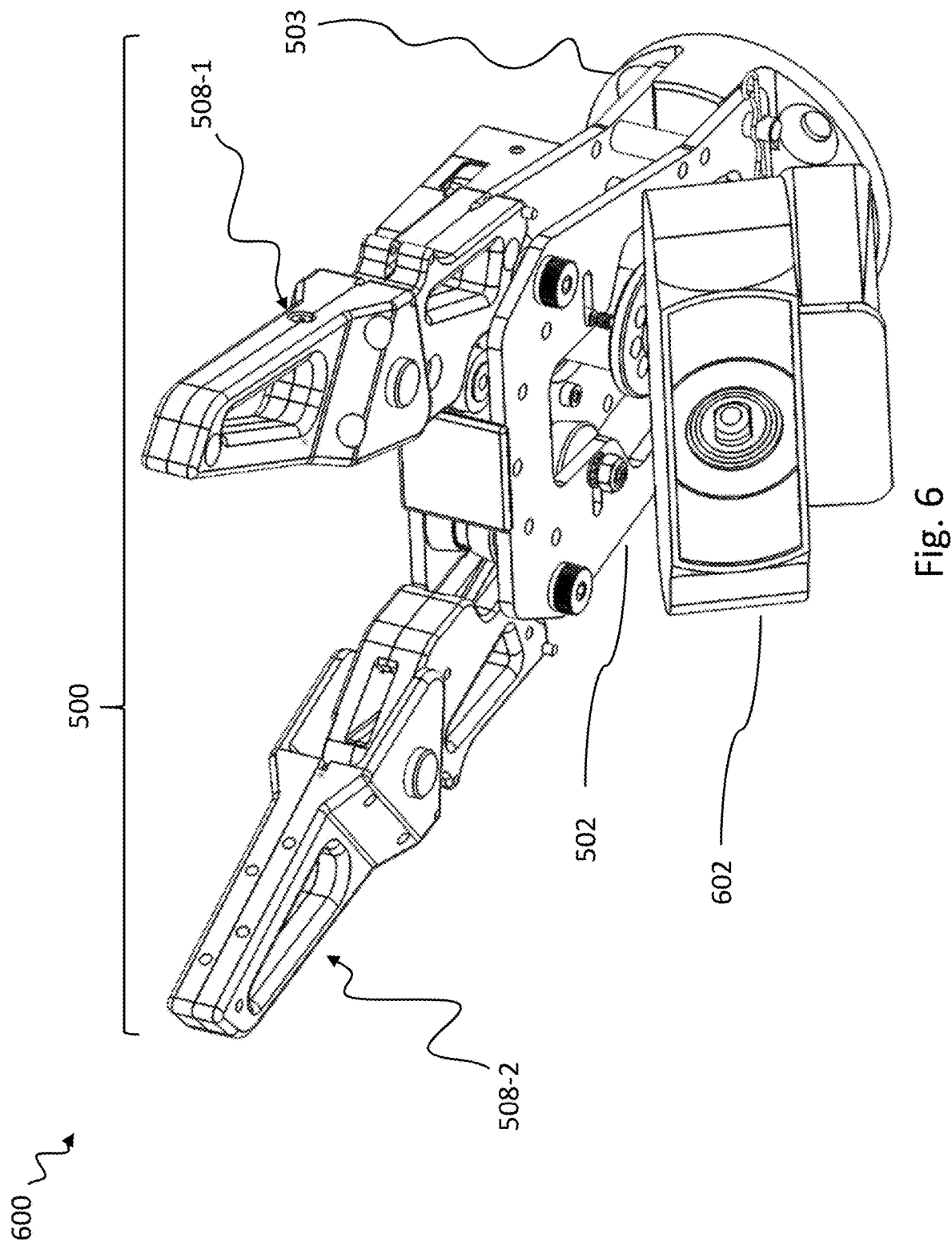
FIG. 6 illustrates, in a perspective view, the device shown in FIG. 5 in combination with a camera.

FIG. 6 illustrates device 600 including exemplary device 500 in combination with a camera or other imager 602. As shown the camera 602 is physically coupled (e.g., connected, attached, connected to an intermediate body) to base 502. The camera 602 may be physically coupled to a manipulator to which the base 502 is also coupled. Exemplary cameras include 720, 1080, or 4 kilo-pixel cameras, such as, LOGITECH™ C920 HD Pro, C922 Pro Stream, C930e HD, or 4K Pro webcams from Logitech International S.A. of Lausanne, CH with place of business in Newark, Calif., US.

The camera 602 is oriented toward fingers 508 and in the distal direction with respect to manipulator 406 (when present). In some implementations, camera 602 is disposed in an inferior position (i.e., below) to base 502. When camera 602 is disposed below base 502, the camera can image items as and after the robot stows the item in a target reception space, and image the reception space. In some implementations, camera 602 is disposed in a superior position (i.e., above) to base 502. The orientation of up and down can be defined with respect to direction of gravity as the device 600 operates as an end-effector. For example, the camera 602 is disposed below base 502 prior to, during, or after grasping an item. The camera may be coupled to manipulator 406 at a location separated from base 502 by at least one joint. In some implementations, the camera 602 is disposed on the wrist of manipulator 406.

Figure 7:
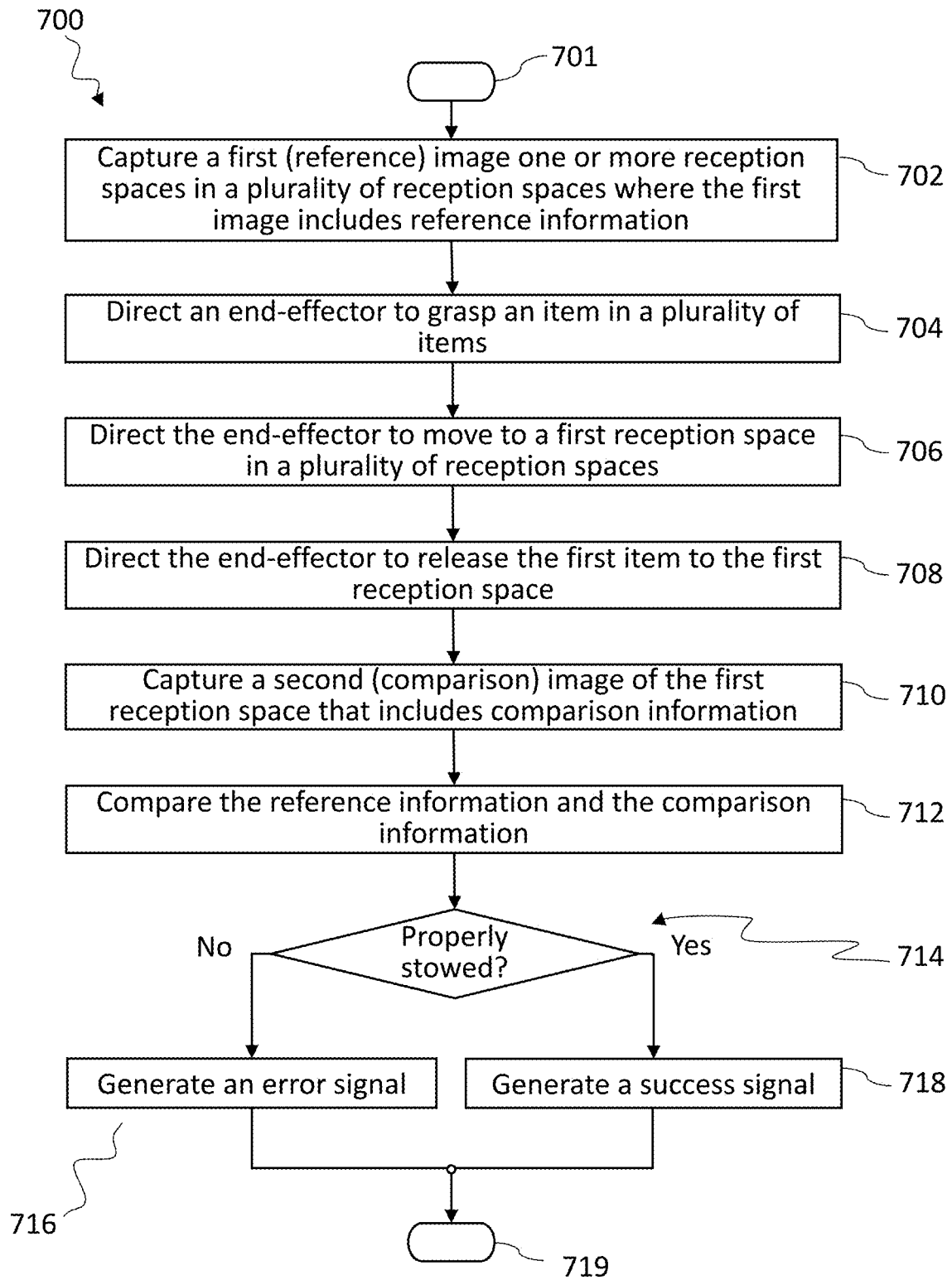
FIG. 7 is a flow-diagram illustrating an implementation of a method of operation for a system including an end-effector and camera.

FIG. 7 shows method 700 executable by a controller, such as circuitry or at least one hardware processor, for operation in a robotic system. Method 700, in part, shows how a controller can verify an item is stowed correctly. Those of skill in the art will appreciate that other acts may be included, removed, and/or varied or performed in a different order to accommodate alternative implementations.

Method 700 is described as being performed by a controller, for example, a control subsystem or processor(s) in computer system 106 or system 300, in conjunction with other components, such as those found in, system 100, computer system 106, robot 200, system 300, device 400, and device 600. However, method 700 may be performed by another agent, such as, multiple controllers or by another system.

For performing part or all of method 700 (or other methods herein), the controller may be at least one hardware processor. A hardware processor may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. The hardware processor may be referred to herein by the singular, but may be two or more processors. The hardware processor(s) may, for example, execute one or more sets of processor-executable instructions and/or data stored on one or more nontransitory processor-readable storage devices. For performing part or all of method 700 one or more robots may be included in the operation of a robotic system. Exemplary robots and components are described herein.

For clarity, method 700 is described as being performed by one end-effector and one camera. Those of skill in the art will appreciate that method 700 may be performed by at least one end-effector and at least one camera.

Method 700 begins at 701, for example, in response to an invocation by the controller.

At 702, the controller causes a camera to capture (e.g., create) a reference image of one or more reception spaces in a plurality of reception spaces. That is, the controller executes processor-executable instructions which, when executed, cause the camera to capture at least a first image of at least a first reception space. For example, the controller causes camera to 604 to capture one image for each of reception spaces 412-1, 412-2, 412-3, and so on. In some implementations, the camera is disposed on the end-effector(s) or manipulator(s), and the end-effector(s) or manipulator(s) move the camera from place to place to capture a reference image one or more reception spaces. That is, at 702, the controller executes processor-executable instructions which, when executed, cause a manipulator to move a camera, e.g., camera 602, to one or more reception spaces. In some implementations, there is one camera disposed proximate to one end-effector coupled to one manipulator. In some implementations, there is one camera coupled to a first manipulator and one end-effector coupled to a second manipulator.

The controller, at 702, creates the reference image at a reference time. In some implementations, the controller creates a plurality of reference images for a plurality of reception spaces at a shared reference time or at a plurality of reference times. The reference image may be termed the first image. In later processing operations, the reference image may be replaced with a later created reference image. The reference image includes reference information, that is, processor-readable information that represents a reception space and any items included therein. The reference information may include the number of items present in the reception space.

At 704, the controller directs the end-effector to grasp (or otherwise releasably engage) an item in (e.g., included in) a plurality of items. For example, the grasp a first item from an input space disposed proximate to, e.g., reachable by, the end-effector. In some implementations, the controller directs the end-effector to physically partition a plurality of items into two or more defined parts per a defined partition for the plurality of items. The plurality of items could be found in input space 408 shown in FIG. 4. Sometimes the controller will not detect the end-effector failed to grasp the item.

At 706, the controller directs the end-effector to move to a first reception space, e.g., reception space 412-1. If the end-effector successfully grasped the item and continues to successfully grasp the item, the end-effector moves to the first reception space with the item. Sometimes the item may fall from the end-effector as the end-effector moves, e.g., is moved by manipulators, to the first reception space. The controller, via one or more sensors, may not detect that the item has fallen from the end-effector short of the intended destination (e.g., first reception space).

At 708, the controller directs the end-effector to release the item to (e.g., release in, release above) the first reception space. For example, the controller, executing processor-executable instructions, directs the end-effector to release the item in the first reception space, e.g., reception space 412-1. The controller may direct the end-effector to release the item above the first reception space such that the item falls into the first reception space. Sometimes the end-effector may fail to release the item to the item in the first reception. That it, the item does not assume a stable position in the reception space. For example, the item falls out of the first reception space.

At 710, the controller directs the camera to capture a comparison image of the first reception space. That is, the controller executes processor-executable instructions which, when executed, cause the camera to capture at least a second image of at least the first reception space. The controller directs the camera to capture a comparison image after the controller directs the end-effector to release the item to the first reception space. The controller may execute the imaging instruction or data 268 to create a comparison image of the first reception space. The comparison image may be termed the second image. The comparison image includes comparison information, that is, processor-readable information that represents a reception space and any items included therein. For example, the comparison information can include the number of items in a reception space.

At 712, the controller compares the reference information and the comparison information. For example, the controller compares the reference image and the comparison image for the first reception space. The controller could compare the first image created at 702 above with the second image created at 710 above. In some implementations, the controller executes the imaging instruction or data 268 to compares reference information and the comparison information. For example, the controller compares the first image of the first reception space and the second image of the first reception space. The controller may compare the second image of the first reception space to an earlier created reference image that was created after the first image created at 702 above.

At 714, the controller may extract the reference information from the reference image (e.g., first image). At 714, the controller may extract the comparison information from the comparison image (e.g., second image). The reference information or the comparison information may include one or more Scale-Invariant Feature Transform (SIFT) points extracted from a respective image. SIFT points allow two images to be compare by comparing the SIFT points.

At 714, the controller determines whether the item was properly stowed. For example, the controller can determine whether the comparison of the first image and the second image indicates that the first item was correctly stowed in the first reception space, for example determining that the total number of items identified in the second image of the first reception space matches an expected total number of items in the first reception space. The expected total number of items may be a sum of the total number of items identified in the first image of the first reception space and the total number of items to be stowed as part of a currently executing or most recently executed stowing operation for the respective first reception space. The controller may execute the imaging instruction or data 268 to check if the first item was correctly stowed in the first reception space. The controller may execute the imaging instruction or data 268 to compare reference information and the comparison information. The controller may execute the partition instructions or data 372 to check if the first item was correctly stowed in the first reception space.

If the total number of items detected does not match the expected number of times (714-No), the controller produces or generates an error signal at 716, the error signaling including error information that represents first item was not correctly stowed in the first reception space. The error information could include the reference image and the comparison image or information extract from one or both or a comparison of the two images. The controller may use the error signal to update a storage device, e.g., storage device(s) 308. The controller may send the error signal through a communication channel, e.g., communication channel network or non-network communication channel 108.

If the total number of items detected does not match the expected number of times (714-Yes), the controller generates a success signal at 718, the success signal including success information that represents first item was correctly stowed in the first reception space. The success information could include the reference image and the comparison image or information extract from one or both or a comparison of the two images. The controller may use the success signal to update a storage device. The controller may send the success signal through a communication channel, e.g., network or non-network communication channel 108.

At 719, the method 700 ends until invoked again. Method 700 may be invoked as part of another method, such as, method 800 shown in FIG. 8.

Figure 8:
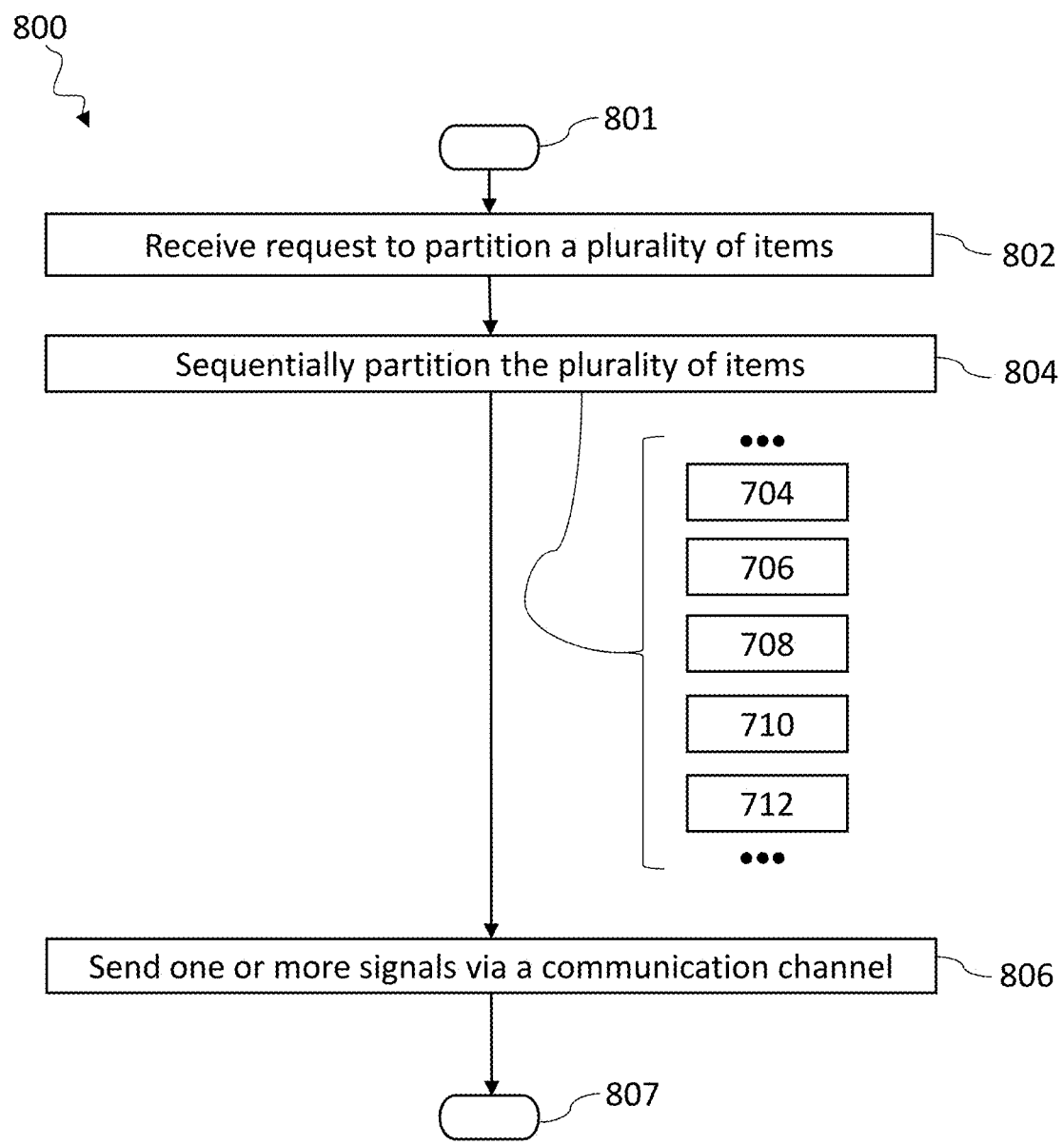
FIG. 8 is a flow-diagram illustrating an implementation of a method of operation for a system including an end-effector and camera.

FIG. 8 shows a method 800 of operation a robotic system. Method 800 may be controlled by at least one processor in communication with at least one end-effector and at least one camera. Those of skill in the art will appreciate that other acts may be included, omitted, and/or varied to accommodate alternative implementations. Method 800 is described as being performed by a controller, for example, a control subsystem or processor(s) in computer system 106 or system 300, in conjunction with other components, such as those found in, system 100, computer system 106, robot 200, system 300, device 400, and device 600. However, method 800 may be performed by another agent, such as, multiple controllers or by another system.

Method 800 begins at 801 with invocation by the controller.

At 802, the controller receives request to partition a plurality of items. For example, the controller receives processor-executable instructions which, when executed, causes the at least one end-effector to physically partition a plurality of items into two or more defined parts per a defined partition for the plurality of items. The end-effector may place a respective part of the two or more defined parts in a respective reception space of a plurality of reception spaces.

After receiving a plurality of items in an area (e.g., input space 408) reachable by at least one end-effector, at 804, the controller, at least one end-effector, and at least one camera sequentially partition the plurality of items. The controller may execute processor-executable instructions which cause the end-effector to physically move at least one item in the plurality of items. At 804, the controller may perform or cause a robotic system to perform some or all of acts 704-714 (even), and may include further acts such as 702, 716, and 718. The controller at 804 may execute further processor-executable instructions which, when executed, cause the controller to perform further acts such as 902 and 904 shown in FIG. 9A below, and/or 906-916 (even) shown in FIG. 9B below, At 806 the controller sends one or more signals. The controller may send an error signal through a communication channel. The controller may send a success signal through a communication channel. In some implementations, the controller, based on the error signal or the success signal may update a processor-readable storage device.

At 807, the method 800 ends until invoked again. Method 800, like method 700 and method 900, may be invoked by a remote procedure call by another agent.

Figure 9A:
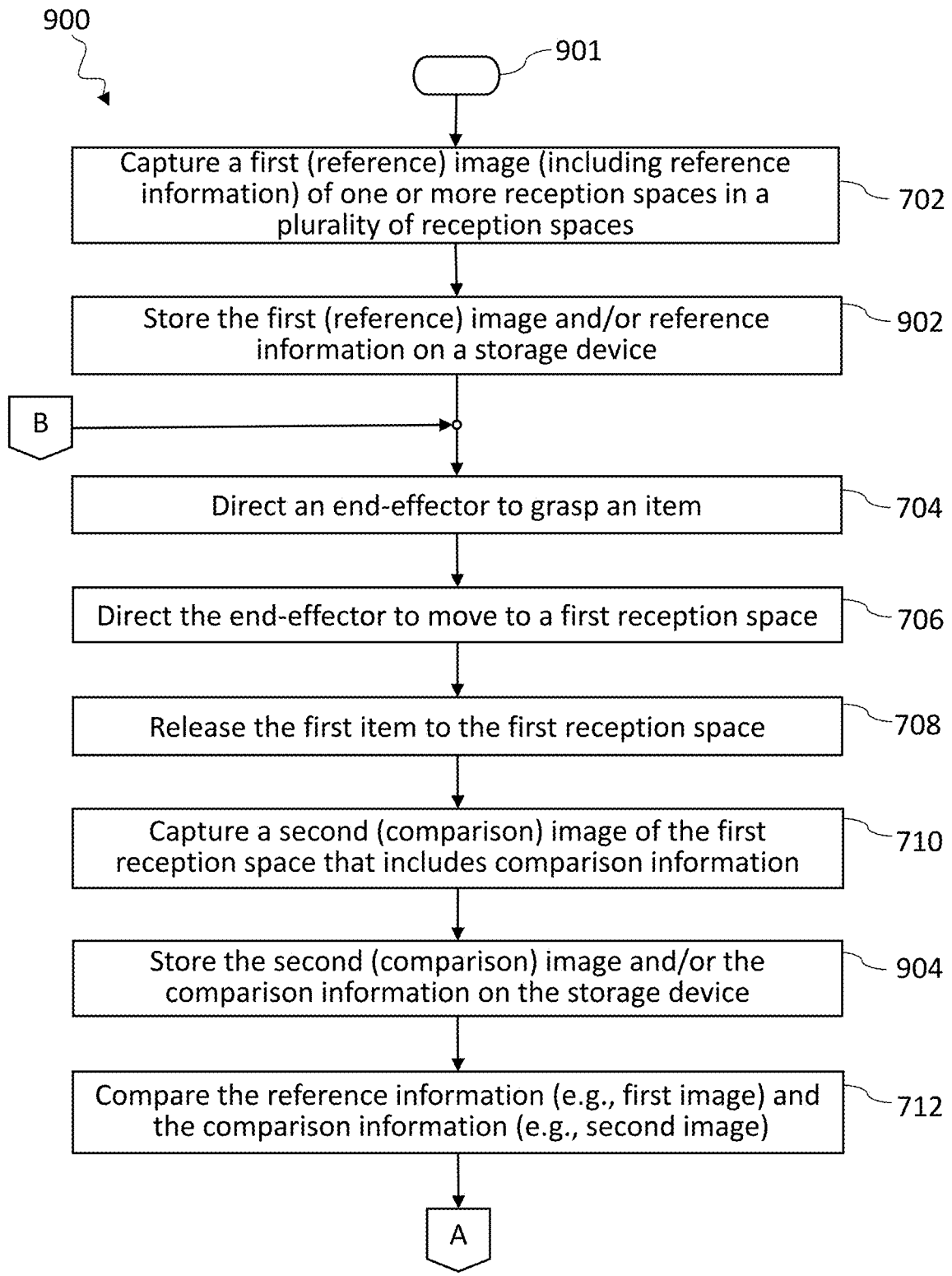
FIG. 9A and FIG. 9B are a flow-diagram illustrating an implementation of a method of operation for a system including an end-effector and camera.
Figure 9B:
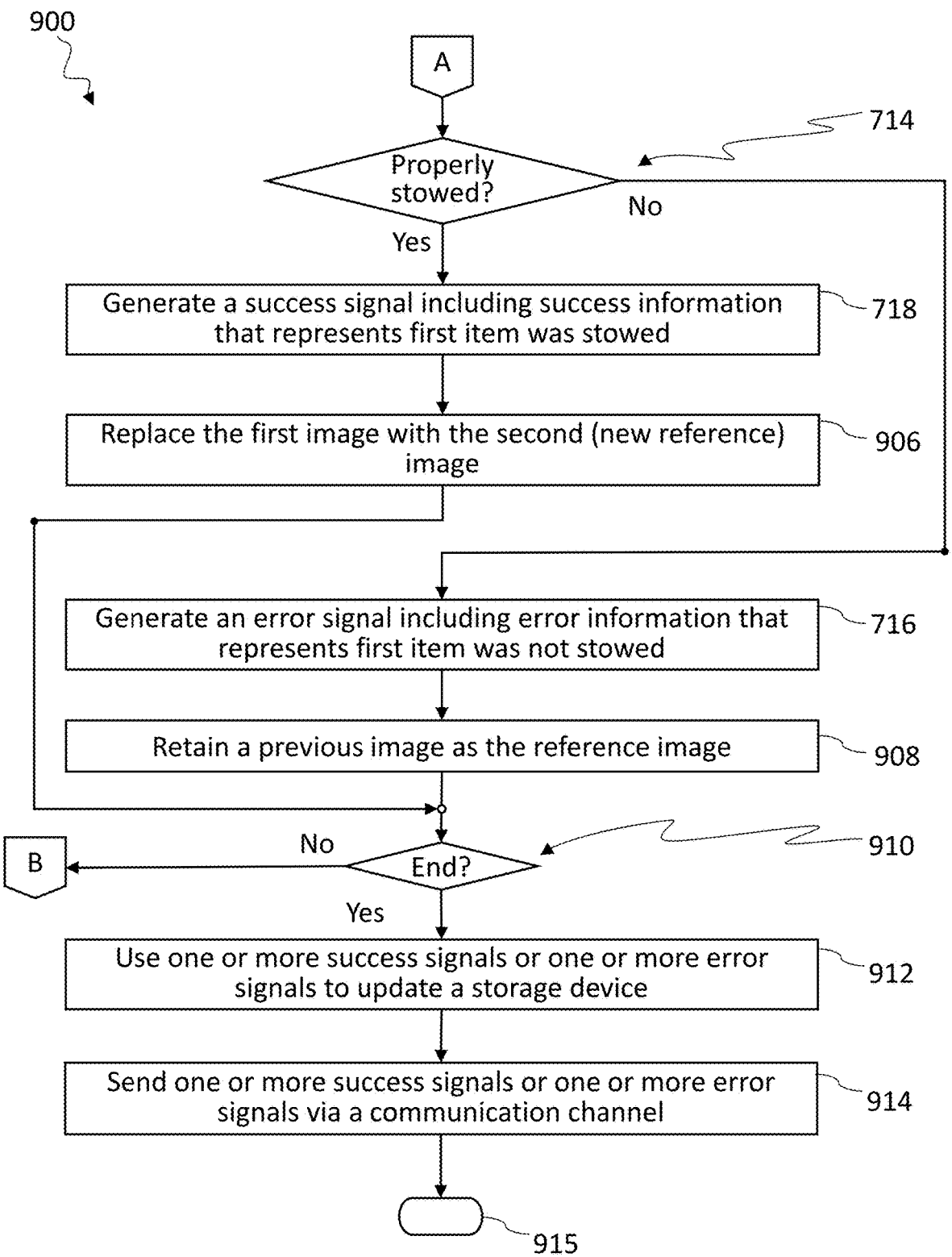

FIGS. 9A and 9B show a method 900 of operation a robotic system. Method 900 may be controlled by at least one processor in communication with at least one end-effector and at least one camera. FIG. 9A includes a first part of the method 900 with two "offsheet connectors" ("A" and "B") to couple the first part of the method to a second part of the method 900 shown on a separate sheet. FIG. 9B includes a second part of the method 900. Those of skill in the art will appreciate that other acts may be included, omitted, and/or varied to accommodate alternative implementations. Method 900 is described as being performed by a controller, for example, a control subsystem or processor(s) in computer system 106 or system 200, in conjunction with other components, such as those found in, system 100, computer system 106, robot 200, system 300, device 400, and device 600. However, method 900 may be performed by another agent, such as, multiple controllers or by another system.

Method 900 begins at 901 with invocation by the controller. Method 900 could be invoked after 804 in method 800.

At 702, the controller causes a camera to capture a reference image of one or more reception spaces in a plurality of reception spaces. The reference image includes reference information. For example, the reference image may be associated with a reception space. In some implementations, the camera is disposed on the end-effector(s) or manipulator(s), and the end-effector(s) or manipulator(s) move the camera from place to place to create a reference image one or more reception spaces. In some implementations, the plurality of reference images is created for similar angle of view for most or all of the reception spaces in the plurality of reception spaces. Method 900 is described as including one reference image for one or more reception spaces in a plurality of reception spaces. However, the skilled addressee will recognize two or more images may be used in place of one.

At 902, the controller updates a processor-readable storage device with processor-readable information that represents the reference image and/or reference information. For example, at least one processor 204 stores the reference image as processor-readable information in nontransitory computer- or processor-readable storage device 308.

At 704, the controller directs an end-effector to grasp an item in a plurality of items. The item may be a first item in a plurality of items or later item as part of a sequential processing of the plurality of items. The controller may direct an end-effector to grasp an item in a plurality of items after the execution of 1008 with outcome "No" in method 900 shown in FIG. 9B.

At 706, the controller directs the end-effector to move to a target reception space in the plurality of reception spaces.

At 708, the controller directs the end-effector release the item to the target reception space.

At 710, the controller directs the camera to capture a comparison image of the target reception space.

At 904, the controller updates a processor-readable storage device with processor readable information that represents the comparison image and/or comparison information. The storage device may be the same storage devices as at 902 above. In some implementations, the reference image of the target reception space is a first image, and comparison image of the target reception space is a second image.

At 712, the controller compares the reference information (e.g., reference image) and the comparison information (e.g., comparison image) for the target reception space. For example, the controller compares the reference image created at 702 above with the comparison image created at 710 above. In some implementations, the controller executes the imaging instruction or data 268 to compares the reference image and the comparison image. For example, the controller compares the first image of the target reception space and the second image of the target reception space. The controller may compare the second image of the target reception space to an earlier created reference image that was created after the first image created at 702 above.

An example of a continuation of method 900 is shown in FIG. 9B.

Turning to FIG. 9B, at 714, the controller checks if the reference image and/or information, and the comparison image and/or information once compared show the item was correctly stowed in the target reception space.

At 718, 714-Yes, the controller generates a success signal including success information that represents the item was correctly stowed in the target reception space.

At 908 the controller replaces the reference image with the comparison image, now a new reference image. Processing continues at 912.

At 716, 714-No denoting the item was not successful stowed in the target reception space, the controller generates an error signal including error information that represents the item was not correctly stowed in the target reception space.

At 908 the controller retains (e.g., keeps, creates information that directs a processor to store) a previous image (e.g., the reference image from 702 above) as the reference image.

At 910, the controller checks if the robotic system is to cease to process items. If processing is to cease or end (910-Yes), then control passes to 912. If processing is to continue (910-No), then processing control returns to 704 (FIG. 9A), which is described herein above.

At 912, the controller uses one or more success signals or one or more error signals to update a storage device. In some implementations, the controller updates the storage device prior to 1008, that is, as part of sequential processing. In some implementations, the controller updates the storage device as a batch act, e.g., after 910.

At 914, the controller sends one or more success signals or one or more error signals via a communication channel. The controller may send one or more success signals or one or more error signals via communication channel, e.g., network or non-network communication channel 108. In some implementations, the controller sends one or more signals prior to 1008, that is, as part of sequential processing. In some implementations, the controller sends the one more signals as a batch act, e.g., after 910.

At 915, the method 900 ends until invoked again.

The above description of illustrated examples, implementations, and embodiments, including what is described in the Abstract, is not intended to be exhaustive or to limit the embodiments to the precise forms disclosed. Although specific examples are described herein for illustrative purposes, various equivalent modifications can be made without departing from the spirit and scope of the disclosure, as will be recognized by those skilled in the relevant art. The teachings provided herein of the various embodiments can be applied to many computer systems, robotic systems, and robots, not necessarily the exemplary computer systems, robotic systems, and robots herein and generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each act and/or operation within such block diagrams, flowcharts, or examples can be implemented, individually and/or collectively, by a wide range of hardware, software, firmware, or combinations thereof. In some embodiments, the present subject matter is implemented via Application Specific Integrated Circuits (ASICs). However, those skilled in the art will recognize that the embodiments disclosed herein, in whole or in part, can be equivalently implemented in standard integrated circuits, as one or more computer programs (i.e., processor-executable instructions) executed by one or more processor based devices (e.g., as one or more sets of processor-executable instructions running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the source code for the software and or firmware would be well within the skill of one of ordinary skill in the art in light of the teachings of this disclosure.

As used herein processor-executable instructions and/or processor-readable data can be stored on any non-transitory computer-readable storage medium, e.g., memory or disk, for use by or in connection with any processor-related system or method. In the context of this specification, a "computer-readable storage medium" is one or more tangible non-transitory computer-readable storage medium or element that can store processes-executable instruction and/or processor-readable data associated with and/or for use by systems, apparatus, device, and/or methods described herein. The computer-readable storage medium can be, for example, but is not limited to, an electronic, magnetic, optical, electromagnetic, infrared, or semiconductor system, apparatus, device, or articles of manufacture. Processor-executable instructions are readable by a processor. More specific examples (a non-exhaustive list) of the computer-readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory storage media.

Many of the methods described herein can be performed with variations. For example, many of the methods may include additional acts, omit some acts, and/or perform acts in a different order than as illustrated or described.

The various examples, implementations, and embodiments described above can be combined to provide further embodiments. Aspects of the embodiments can be modified, if necessary, to employ systems, circuits, devices, methods, and concepts in various patents, applications, and publications to provide yet further embodiments.

These and other changes can be made to the examples, implementations, and embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method controlled by at least one processor in communication with at least one end-effector and at least one camera physically coupled to the at least one end-effector, the method comprising:

causing the at least one camera to capture a plurality of reference images for a plurality reception spaces, wherein a respective reference image in the plurality of reference includes respective reference information;

partitioning sequentially, by the at least one processor and the at least one end-effector, a plurality of items, wherein the partitioning includes:

grasping, by the at least one end-effector, a respective item from the plurality of items;

after causing the at least one camera to capture the plurality of reference images, releasing, by the at least one end-effector, the respective item to a respective reception space in the plurality of reception spaces, wherein the respective reception space is associated with a respective reference image in the plurality of reference images;

after releasing the respective item to the respective reception space, capturing, by the at least one camera, a comparison image of the respective reception space, wherein the comparison image includes comparison information;

comparing, by the at least one processor, respective reference information for a respective reference image in the plurality of reference images with comparison information included in the comparison image; and when the respective reference information and the comparison information once compared show the respective item was not correctly stowed in the respective reception space, generating, by the at least one processor, an error signal that includes error information that represents respective item was not correctly stowed in the respective reception space.

2. The method of claim 1 wherein grasping a respective item from the plurality of items comprises grasping, by the at least one end-effector, a respective item from an input space reachable by the at least one end-effector.

3. The method of claim 1 wherein the at least one camera is physically coupled to at least one manipulator, the method further comprising:
by the at least one processor, directing the at least one manipulator to move the at least one camera in to a plurality of locations, wherein a respective location in the plurality of locations includes respective view of a respective reception space included in the plurality of reception spaces.

4. The method of claim 1 further comprising: when the respective reference information for the respective reference image in the plurality of reference images and the comparison information included in the comparison image once compared show the respective item was correctly stowed in the respective reception space, generating, by the at least one processor, a success signal including success information that represents the respective item was correctly stowed in the respective reception space.

5. The method of claim 1 further comprising:
comparing, by the at least one processor, the respective reference image in the plurality of reference images with the comparison image.

6. The method of claim 1 further comprising:
extracting, by the at least one processor, the respective reference information from the respective reference image in the plurality of reference images; and
extracting, by the at least one processor, the comparison information from the comparison image.

7. The method of claim 1 further comprising:
receiving, by the at least one processor, processor-readable information that represents a request to partition the plurality of items.

8. The method of claim 1 further comprising:
storing, by the at least one processor, the plurality of reference images as processor-readable information in a processor-readable storage device.

9. The method of claim 1 further comprising:
storing, by the at least one processor, the reference information for the respective one of the reference images as processor-readable information in a processor-readable storage device.

10. The method of claim 1 further comprising:
replacing, by the at least one processor, the respective reference information for the respective reference image in the plurality of reference images with comparison information included in the comparison image.

11. A system comprising:
at least one end-effector moveable to be at least proximate with a plurality of reception spaces including a first reception space;
at least one camera physically coupled to the at least one end-effector;
at least one processor communicatively coupled to the at least the at least one end-effector, and the at least one camera; and
at least one nontransitory processor-readable storage device communicatively coupled to the at least one processor and which stores processor-executable instructions which, when executed by the at least one processor, cause the at least one processor to:
cause the at least one camera to capture a first image of the first reception space, wherein the first image includes reference information;
direct the at least one end-effector to grasp a first item from an input space reachable by the at least one end-effector;
after the at least one camera captures the first image, direct the at least one end-effector to release the first item to the first reception space;
after the at least one end-effector releases the first item, cause the at least one camera to capture a second image of the first reception space, wherein the second image includes comparison information;
compare the reference information and the comparison information; and
if the reference information and the comparison information once compared show the first item was not correctly stowed in the first reception space, generate an error signal including error information that represents first item was not correctly stowed in the first reception space.

12. The system of claim 11 wherein the processor-executable instructions to cause the at least one camera to take a first image of a first reception space, when executed, further cause the at least one processor to:
cause the at least one camera to capture a plurality of images of the plurality of reception spaces, wherein a respective image in the plurality of images is of a respective reception spaces in the plurality of reception spaces.

13. The system of claim 12 further comprising:
a frame;
at least one manipulator physically coupled to the frame and the at least one camera; and
wherein the processor-executable instructions to cause the at least one camera to capture the plurality of images of the plurality of reception spaces when executed, further cause the at least one processor to:
direct the at least one manipulator to move the at least one camera in to a plurality of locations, wherein a respective location in the plurality of locations includes respective view of a respective reception space included in the plurality of reception spaces.

14. The system of claim 11 wherein the processor-executable instructions, when executed, further cause the at least one processor to:
if the reference information and the comparison information once compared show the first item was correctly stowed in the first reception space, generate a success signal including success information that represents first item was correctly stowed in the first reception space.

15. The system of claim 11 wherein the processor-executable instructions to compare the reference information and the comparison information, when executed, further cause the at least one processor to:
compare the first image and the second image.

16. The system of claim 11 wherein the processor-executable instructions to compare the reference information and the comparison information, when executed, further cause the at least one processor to:
extract the reference information from the first image; and
extract the comparison information from the second image.

17. The system of claim 11 wherein the at least one camera is disposed below and physically coupled to the at least one end-effector.

18. The system of claim 11 wherein the processor-executable instructions, when executed, further cause the at least one processor to:
store the first image of the first reception space as processor-readable information.

19. The system of claim 11 wherein the processor-executable instructions, when executed, further cause the at least one processor to:
store the reference information as processor-readable information.

20. The system of claim 11 wherein the processor-executable instructions, when executed, further cause the at least one processor to:
replace the reference information with the comparison information.

* * * * *